United States Patent [19]

Reynolds et al.

[11] Patent Number: 4,807,531

[45] Date of Patent: Feb. 28, 1989

[54] CONTEMPORARY COMPOSITE POLAR BOSS

[75] Inventors: Hugh M. Reynolds, San Jose, Calif.; Curt M. Kawabata, North Ogden, Utah

[73] Assignee: The United States of America as represented by the Secretary of the Air Force, Washington, D.C.

[21] Appl. No.: 109,557

[22] Filed: Oct. 16, 1987

[51] Int. Cl.$^4$ .................................................. F42B 4/06
[52] U.S. Cl. ............................. 102/347; 102/291; 60/253; 220/3; 239/265.15
[58] Field of Search ................. 102/347, 291; 60/253; 220/3; 239/265.15

[56] References Cited

U.S. PATENT DOCUMENTS

| | | | |
|---|---|---|---|
| 3,952,664 | 4/1976 | Schmidt et al. | 102/89 |
| 4,421,806 | 12/1983 | Marks et al. | 428/36 |
| 4,438,858 | 3/1984 | Grover | 220/3 |
| 4,498,292 | 12/1985 | White | 60/256 |
| 4,577,542 | 3/1986 | O'Driscoll | 60/253 X |
| 4,581,263 | 4/1986 | Lukas | 428/36 |
| 4,585,136 | 4/1986 | Clark | 220/3 |
| 4,588,622 | 5/1986 | Sukarie | 428/35 |
| 4,596,619 | 6/1986 | Marks | 156/171 |
| 4,602,480 | 7/1986 | Hill et al. | 60/253 |
| 4,649,701 | 3/1987 | Wendel | 60/253 X |

Primary Examiner—Peter A. Nelson
Attorney, Agent, or Firm—William G. Auton; Donald J. Singer

[57] ABSTRACT

Composite polar bosses applied in rocket motor cases have very desirable characteristics. The lead time for a boss can be reduced from 6-12 months to 2-3 months. Weight savings for the boss are about 20-40%. A composite polar boss which attaches closures to solid fueled rocket motor cases is disclosed. This polar boss is a carbonized fabrication which sits within a circumferential indentation within the motor case, and has a threaded inner circumference which permits the closure to be attached thereto. The materials of the boss are selected to permit a service temperature of 350 degrees F.

4 Claims, 4 Drawing Sheets

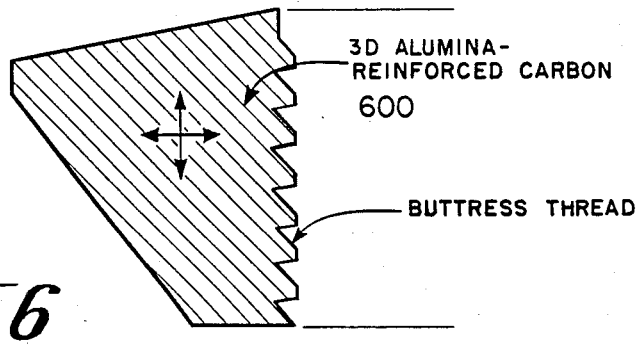
_Fig. 6_
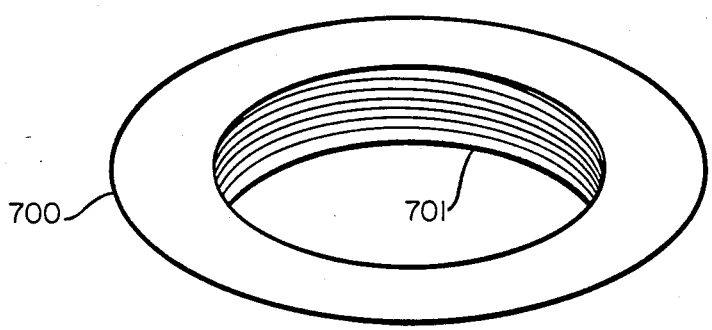
_Fig. 7_

CONTEMPORARY COMPOSITE POLAR BOSS

STATEMENT OF GOVERNMENT INTEREST

The invention described herein may be manufactured and used by or for the Government for governmental purposes without the payment of any royalty thereon.

CROSS-REFERENCE TO RELATED APPLICATIONS

The subject matter of this application is related to the subject matter contained in the following U.S. patent applications: application Ser. No. 109,810, filed herewith, entitled "Advanced Composite Polar Boss" by Mr. Hugh Reynolds et al; and application Ser. No. 852,547 filed Apr. 16, 1986, now U.S. Pat. No. 4,475,008 entitled "Process for Carbon-Carbon Composite Fabrication" by Ms. Irene G. Plotzker et al, the disclosures of which are specifically incorporated by reference.

BACKGROUND OF THE INVENTION

The present invention relates generally to rocket propulsion systems, and more specifically to low temperature composite polar boss for use in place of metal for rocket motor polar bosses.

Development and production for solid rocket motors can be seriously affected by the long acquistion lead times for the conventional forged metal polar bosses used in composite motor cases. In addition, the long lead times for forged tooling severely restrict needed development program flexibility in making design changes. As an example, the development program for the inertial upper stage (IUS) solid rocket motors, had lead times of over a year for the closed-die forgings.

The task of providing an alternative to metal for rocket motor polar bosses, particularly for rockets with low temperature operating parameters, is alleviated, to some extent, by the systems disclosed in the following U.S. Patents, the disclosures of which are incorporated by reference;

U.S. Pat. No. 3,952,664 issued to Schmidt et al;
U.S. Pat. No. 4,421,806 issued to Marks et al;
U.S. Pat. No. 4,438,858 issued to Grover;
U.S. Pat. No. 4,581,263 issued to Lukas;
U.S. Pat. No. 4,585,136 issued to Clark; and
U.S. Pat. No. 4,588,622 issued to Sukarie.

Schmidt et al disclose a rocket motor assembly formed by a casing and a unitary nozzle igniter housing portion. The nozzle and ignitor housing portion has a circumferential portion that mates with the internal surface wall of the casing. A seal and fastener holds the housing in place. Grover shows a polar boss in FIGS. 2 and 4.

Clark is concerned with an arrangement for the attachment of an end ring to the body wall of a rocket motor case. The cylindrical wall in the vicinity of metal end ring in Clark is made up of a plurality of layers of three different kinds, the first kind being laid layer having the fibers extending primarily longitudinally i.e., parallel with the axis of the motor case; under this there may be a larger produced by polar winding, and thus also having the fibers extending primarily longitudinally; and then a layer produced by hoop winding.

Sukarie shows in FIGS. 2 and 3 a pressure container of carbon fibers joined to aluminum connection pieces. Lukas teaches a composite formed of carbon fiber in a graphite support matrix. Filament wound composite resin-fiber rocket motor cases form a part of the disclosure in the Marks et al patent.

Since the introduction of carbon-carbon materials into solid rocket motor nozzles, the number of parts making up the nozzle has decreased dramatically, resulting in a much simpler structure. The above-cited Plotzker et al reference is a state-of-the-art process for fabricating carbon-carbon articles. However, while the above-cited references are all instructive, the need remains to provide an alternative to metal for the polar bosses or rocket motors with low operating temperatures, the present invention is intended to satisfy that need.

SUMMARY OF THE INVENTION

The present invention is a composite boss forming part of a rocket motor case and used to attach the rocket nozzle igniter or end closure (hereafter refered to as closure) to the case. The composite portion of the polar boss is machined from a billet made of carbon fibers impregnated with epoxy resin. Fibers can be oriented either in an approximate 50:50:0 or 40:40:20 combination of circumferential, radial and axials respectively. The billet is cured under the temperature and pressure required for proper cure of the epoxy resin. After the composite part is machined from the billet an aluminum seal ring is bonded to it with a compatible film adhesive.

The composite polar boss of the present invention is intended for use in place of metal for rocket motor polar bosses for low temperature (350 degrees F.) applications. A principal purpose of the use of the invention is to reduce the required lead times in the manufacture of polar bosses. The lead time for a boss can be reduced from 6-12 months to 2-3 months. Weight savings for the boss are about 20-40%.

The present invention has three different embodiments. The first contemporary boss provides a means of attaching a closure to a rocket motor case using a design that is 13% lighter in terms of inert weight than a comparable metal boss. Lead time of this first embodiment is 2 to 3 months, compared to 12 months for the metal boss. The composite is composed of a 2D spiral graphite cloth impregnated in epoxy resin. The spiral cloth has a 50/50 mix of circumferential and radial fibers. The cloth is layed-up as one continuous layer with filmed epoxy resin interspersed between helix layers. An aluminum interface for the nozzle attachment and sealing is incorporated in the design. The attachment feature of the boss to closure/nozzle is a buttress thread. This design used high specific strength of the graphite composite and proven metal fastening an sealing concepts.

The second contemporary boss design also used the 2D spiral graphite cloth. A seal ring is used instead of the aluminum attachment feature discussed above. The threads are cut into the composite. The reduction of metal parts in this second design results in a 23% lighter boss than the comparable metal boss. Lead time for this boss is the same as that for the first boss (about 2 to 3 months).

The third contemporary boss design uses a 3D graphite preform impregnated with an epoxy resin. This third design has the same overall dimensions as the second contemporary design. The only difference between them is that the third design uses 3D instead of the 2D graphite/epoxy. This boss is about 27% lighter than the comparable metal boss with a 3- to 4-month lead time.

It is an object of the present invention to provide an alternative to metal bosses, for low temperature applications, in rocket motor cases.

It is another object to reduce the lead times of fabricating rocket motor polar bosses.

It is another object to provide an alternative to metal rocket motor bosses which has reduced weight.

These objects together with other objects, features and advantages of the invention will become more readily apparent from the following detailed description when taken in conjunction with the accompanying drawing wherein like elements are given like reference numerals throughout.

DESCRIPTION OF THE DRAWINGS

FIGS. 4–6 are sectional views of three different embodiments of the present invention; and FIG. 7 is another view of the polar boss of FIG. 6.

DETAILED DESCRIPTION OF THE PREFERRED EMBODIMENT

The present invention is a composite polar boss for use in low temperature applications with rocket motor cases.

Figure 1:
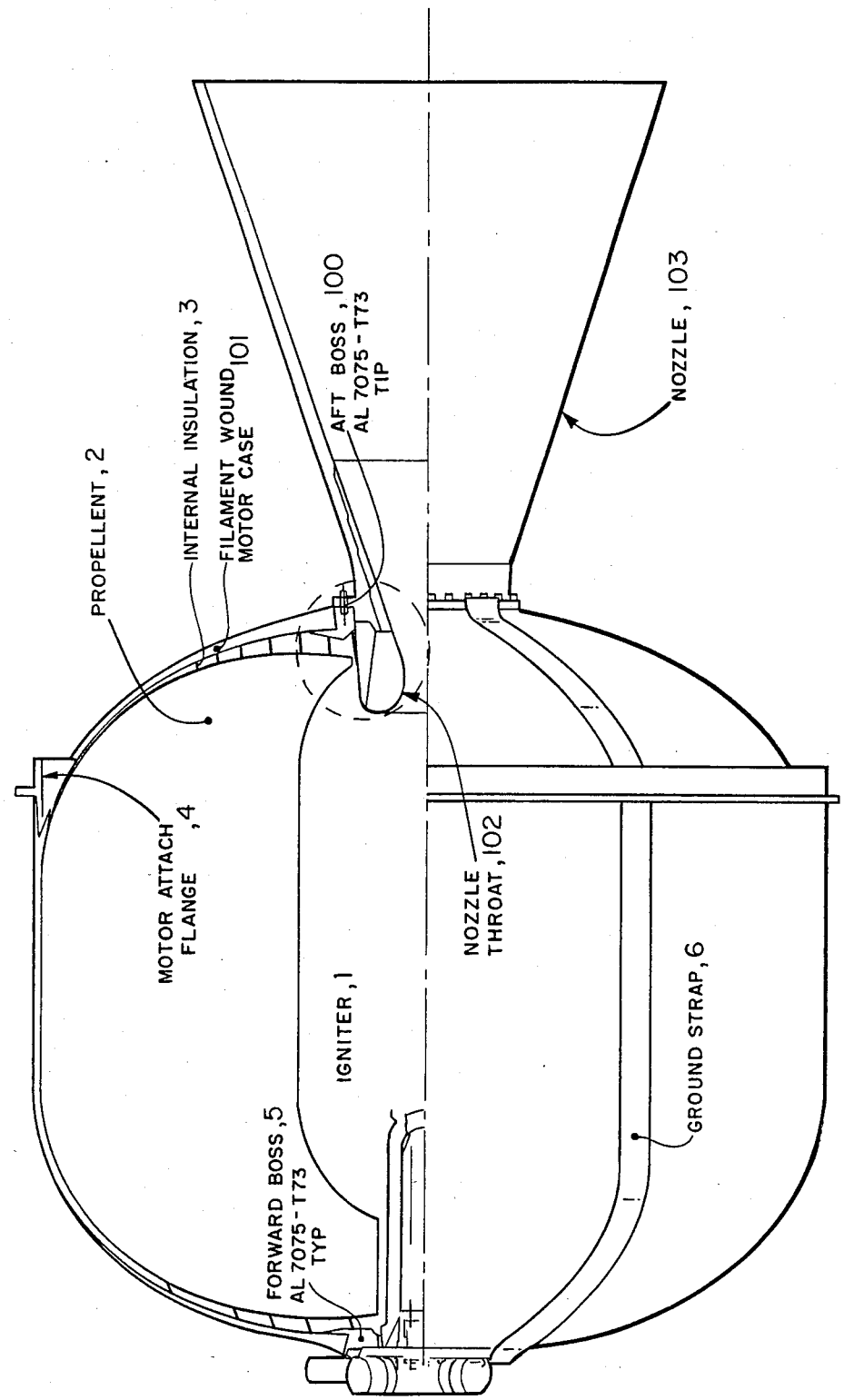
FIG. 1 is a sectional view of a prior art solid fuel rocket motor.

The reader's attention is now directed towards FIG. 1, which is a sectional view of the FW-5 solid rocket motor produced by the Chemical Systems Division (CSD) of United Technologies. This particular rocket motor has a burst pressure range of 1,675 to 1,800 psi, and uses and annular aluminum polar boss 100 to attach the nozzle 103 to the motor case 101.

The aft polar boss 100 is an annular ring with a 5.140 to 6.00 inch inner diameter compatible with existing carbon-carbon fixed or movable hot ball and socket nozzles. Other available motor cases include the MX second-stage, half-scale (33-in.-diameter) motor case. The purpose of the aft polar boss is to provide a means of attaching the rocket nozzle to the motor case. This is better illustrated in the sectional views of FIGS. 2 and 3 as discussed below.

Figure 2:
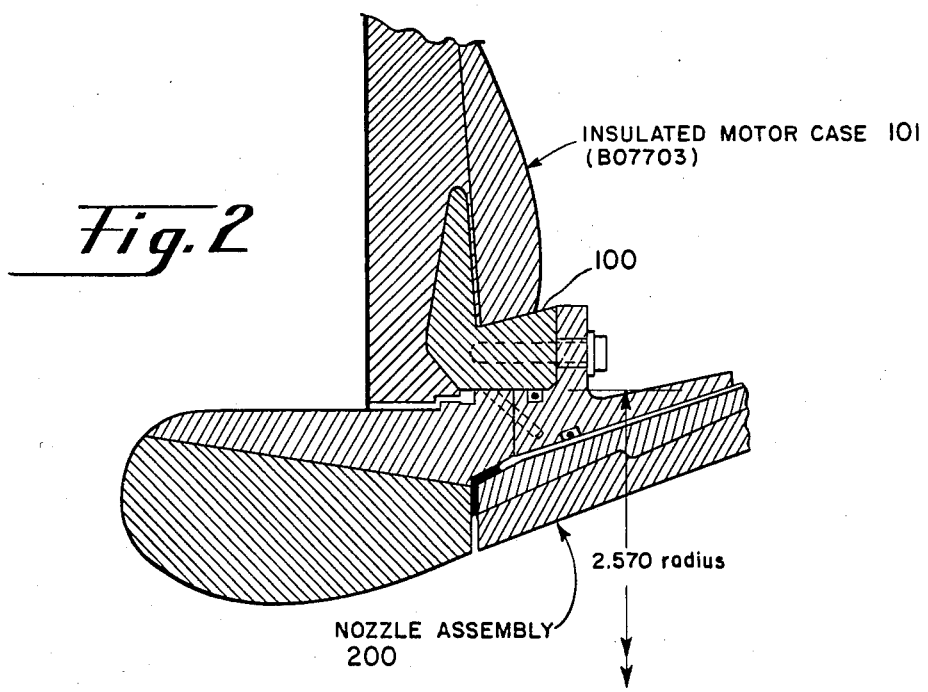
FIGS. 2 and 3 respectively depict detailed sectional views of nozzle assemblies attached to rocket motor cases by polar bosses.
Figure 3:
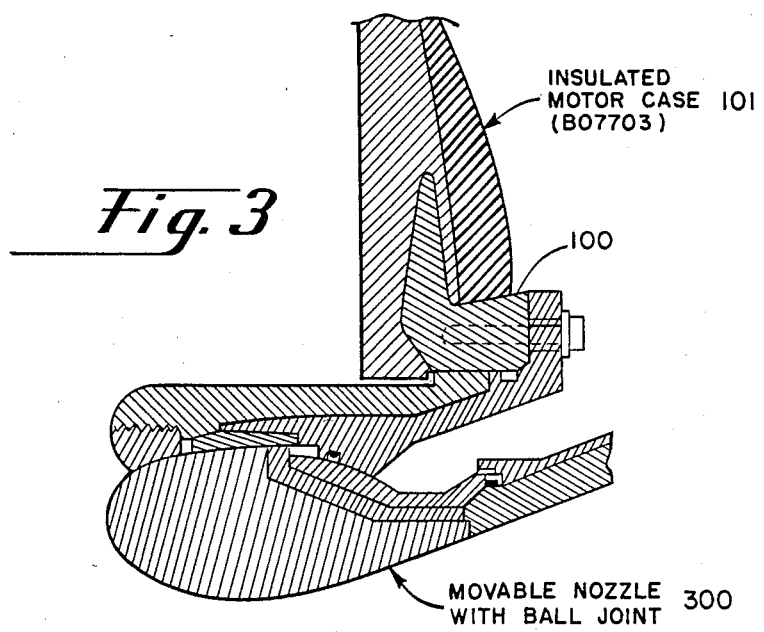

FIGS. 2 and 3 respectively depict detailed sectional views of a typical fixed nozzle 200 (in FIG. 2) and a moveable nozzle 300 (in FIG. 3) which are each attached to the motor case 101 of a FW-5 rocket motor by a polar boss 100. In production the lead time for conventional metal polar bosses ranges from six to twelve months, and for the FW-5 rocket motor has a weight of 1.26 lb.

Figure 4:
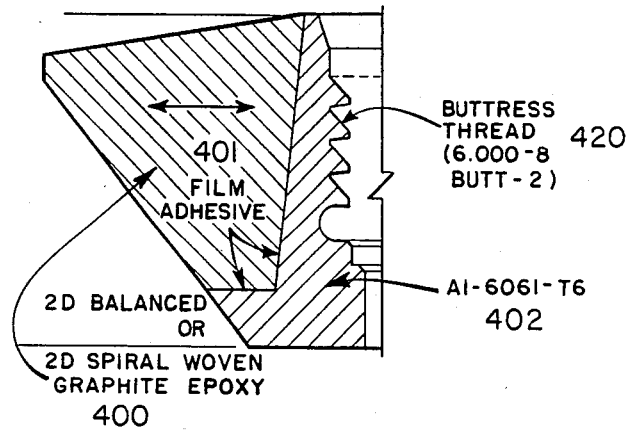
Figure 5:
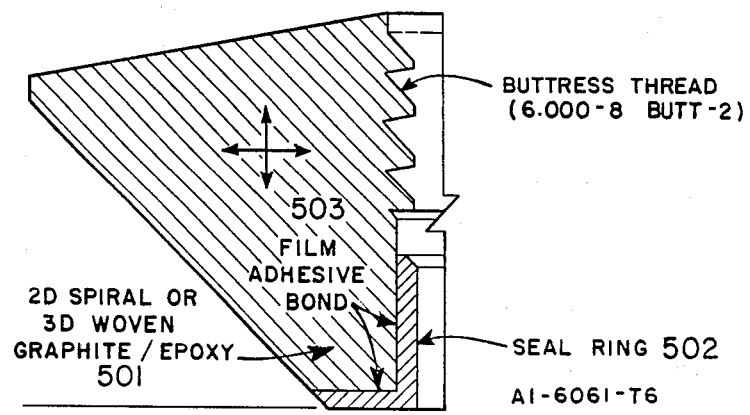

FIGS. 4, 5 and 6 are sectional views of three different embodiments of the contemporary polar boss of the present invention. The system of FIG. 4 is a polar boss composed of: an annular billet 400, an adhesive 401, and a threaded aluminum interface 402.

The annular billet 400 is a donut-shaped ring composed of 2D spiral graphite cloth which is impregnated with an epoxy resin and press cured. The use of the billet 400 of FIG. 4 results in a polar boss design that is 13% lighter in terms of inert weight than a comparable metal boss. Lead time of this first concept is 2 to 3 months, compared to 12 months for the metal boss. The composite is composed of a 2D spiral graphite cloth impregnated in epoxy resin. The spiral cloth has a 50/50 mix of circumferential and radial fibers. The cloth is layed-up as one continuous layer with filmed epoxy resin interspersed between helix layers, and then press cured to form the annular billet 400. The shape of the annular billet 400 is designed to fit inside a complementary indentation in the motor case. When the annular billet is wedged inside the complementary indentation, the entire polar boss becomes fixed to the motor case.

The aluminum interface 402 is an annular ring which has a perimeter which is shaped to fit with the inner circumference of the annular billet 400. The aluminum interface is also fixed to the annular billet by the layer of epoxy 401.

The inner circumference of the aluminum interface is threaded to enable it to be fixed to a set of complementary threads 420, which are machined on the nozzle to form an attachment point. These threads should be machined at a range of between six and eight threads per inch.

The system of FIG. 5 is composed of a threaded annular billet 501; an aluminum seal ring 502, and a flim of adhesive bond 503 which connects the seal ring 502 to the billet 501. The threaded annular billet is fabricated in much the same manner as the annular billet 400 discussed above. The threaded annular billet has threads with a pitch of 8 machined onto the top half of its inner diameter which may be fixed to a complementary set of threads on the buttress of the nozzle assembly.

The lower half of the inner diameter of the threaded annular billet is shaped to fit around the aluminum seal ring 502. The reduction of metal parts in this second design results in a 23% lighter boss then the comparable metal boss. Lead time for this boss is the same as that for the first boss (about 2 to 3 months).

FIG. 6 is a sectional view of a 3D all-composite threaded boss 600 which uses a 3D graphite preform impregnated with an epoxy resin. This third design has the same overall dimensions as the second contemporary design. The main difference between them is that the third design used 3D instead of the 2D graphite/epoxy and cure takes place in a conventional autoclave, hydroclave or oven after vacuum impregnation, whereas the first two designs are press cured. This boss is about 27% lighter than the comparable metal boss with a 3- to 4-month lead time.

The all-composite threaded boss of FIG. 6 has no metal parts. The inner circumference of the boss is threaded to enable it to attach to a set of complementary threads in the buttress of the nozzle assembly. The outer circumference of the boss is shaped to fit in a complementary annular indentation in the motor case of the solid fueled rocket. The threads on the inner circumference of the threaded boss should have a pitch of eight and should be machined at a range of between six threads per inch and eight threads per inch.

As mentioned above, the objective of the present invention is to produce a contemporary composite polar boss that would significantly reduce acquisition lead time over that for conventional forged metal polar bosses. The polar boss designs of FIGS. 4–6 have a set of common requirements that are independent of whether their construction is composite or metallic. These requirements are shown in Table 2. High torsional and hoop stiffness are required to resist polar boss rolling and point loading of the motor case composite overwind, causing boss blowout, and to provide deformation compatibility wih the closure attachments and chamber gas seal.

TABLE 2

| BOSS GENERAL DESIGN REQUIREMENTS | |
|---|---|
| Property | Value |
| Hoop modulus, psi | $4 \times 10^6$ |
| Rail shear strength (across fiber, psi) | 10,000 |
| Interlaminar shear strength, psi | 6,000 |
| Flexure strength, psi | 40,000 |
| Hoop strength, psi | 40,000 |
| Transverse or axial compressive strength, psi | 15,000 |
| Heat distortion temperature, °F. | 320 |

All of the three embodiments are designed so that the contact area between the polar boss and the motor case filament overwind are sufficient to prevent transverse compression (bearing) failures in the overwind. High hoop and radial flexure strengths are achieved consistent with the allowed polar boss rotations and radial motion. The attachment of the nozzle or igniter closures is simple for ease of assembly and to minimize the potential for damage for repeated assemblies. A hot chamber gas seal is achieved to minimize the leakage potential. In addition, the polar boss design is compatible with the design and fabrication steps of the motor case internal insulation. Accordingly, the composite heat distortion temperatures are greater than the insulator cure temperature so that the boss remains dimensionally stable during insulation molding.

When fabricating any of the three embodiments, suitable materials include: Kevlar-49, S-2 glass, polyacrylonitrile (PAN)-based graphite fiber (AS4, T300, or Celion) and pitch-based graphite fiber (Thornel VSB-32 or VS-0066). In addition, boron fiber may be used because of its high specific stiffness and commercial availability. Matrix materials include: 350° F. epoxy, epoxy Novolacs, polyimides, phenolics, and aluminum (boron-/aluminum). Nonforged metallic reinforcements and metal sealing surfaces included are weldable aluminum and low-alloy steels, which are readily available as plate or bar. Design variations in the invention include hybrids incorporating metal sealing or interface structure with the composite boss. Nozzle interfaces are derived from approaches used on all current state-of-the-art motor case designs (IUS, C4, MX, IPSM, etc.). Fabrication approaches that can be used include all conventional composite fabrication techniques such as molded, woven, layup (press-cured or autoclaved), filament-wound (pressure-, over-, or autoclave-cured), pultruded reinforcements, and suitable combinations.

When fabricating any of the billets of FIGS. 4-6, the preferable fiber candidates include two-directionally reinforced (2D) laminates of Kevlar, glass, and boron, and three directionally reinforced (3D) laminates of PAN-/or pitch-based graphites. A 2D or 3D laminate of PAN-based graphite fibers with a modulus of $34+10^6$ psi was selected as the best material candidate because of the better overall performance with the lowest technical risk. The high specific stiffness and strength of the graphite provides a potential for tolerating flaws that result from manufacturing anomalies, such as wrinkles and broken fibers. Similarly, the matrix material selected was an epoxy resin that cures at 350° F. This selection was based primarily on previous experience, dimensional stability at insulation cure temperature, and superior interlaminar strength and processing characteristics. Cost and lead time are not significant selection drivers among the potential candidates, except for the aluminum matrix. Nonforged metals (Al 2219 or Al 6061 and low-alloy steel) were in turn selected for possible alternative sealing surfaces and potential closure interface attachments in combination with graphite/epoxy.

The nozzle fastening alternatives, for use with the present invention, should include conventional methods such as bolted flange with studs, buttress thread, L-shaped segmented shear key, radial pins (shoulder bolts), and combination joints utilizing a nonforged metal reinforcement/seal were traded. The candidate nozzle interfaces were selected for compatibility with both fixed and movable nozzles. For each joint type, the composite strength requirements dictated the type of composite construction that would be required to achieve structural integrity of the composite boss. 2D and 3D laminates were selected because they provide the shortest lead time, are easiest to fabricate, and are low cost. The buttress-threaded joint was in turn selected for its high performance and demonstrated use with both metal and composite polar bosses.

2D laminates are fabricated, as mentioned above, by laying up layers of resin-impregnated, woven, bi-directional cloth or alternate layers of resin-impregnated, uni-directional material. The layup is then hot-press molded and autoclave-/or hydroclave-cured to form a low-void composite. A significant consideration with the layup construction is the presence of numerous layer interfaces and the potential for delamination due to high interlaminar shear stresses. The transverse ply properties are relatively low, being limited by the strength of the epoxy resin. To maximize interlaminar properties, a fiber content of 60% can be used (based on industry experience).

The 2D laminate selected for use in the invention is a woven spiral cloth layup. The principal cloth directions are circumferential and radial to achieve optimum stiffness and strength from the fibers. The woven cloth is commercially available from multiple sources. The cloth can be impregnated with resin by hand working or impregnation under vacuum.

3D laminates are formed by weaving and by filament winding around pultruded rods or bidirectional cloth with pierced rods in the transverse direction. The majority of the 3D preform development conducted to date has been carbon-carbon structures. A wide range of directional properties can be imparted to the final composite by varying fiber end density and orientation. The advantage of 3D composites is improved interlaminar and transverse properties. However, placing fibers in the axial direction reduces the amount of fiber in the circumferential and radial directions, resulting in lower in-plane properties. The 3D preform is processed by vacuum impregnating and autoclave or hydroclave curing. The process has to be tailored somewhat for composite bosses to achieve a composite with low void content. Hot press molding cannot be used to eliminate voids because of the high fiber distortion of the axial fibers.

The 3D composite selected for use in the invention is a filament-wound circumferential and axial fibers bound in pultruded radial rods. This construction was selected primarily because of its mature preform development for carbon-carbon structures.

FIG. 7 is a view of the billet of FIG. 6 which shows the donut shape of the composite. As with the billets of FIGS. 4 and 5, the outer diameter of the billet 700 is shaped to fit into a complementary indentation in the rocket motorcase. The inner diameter 701 of the billet is threaded to attach with a set of complementary threads in the nozzle assembly, in the manner described above.

The lead time for the contemporary composite polar boss is 2 to 3 months, or a 75% improvement over the 12-month lead time associated with the conventional metal polar boss. The system design resulted in the invention being 13% lighter in weight than the metal boss it replaces, while exhibiting 78% greater torsional and hoop stiffness.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A composite polar boss for attaching a closure to a solid fueled rocket motor case, said solid fueled rocket motor case having an opening which has an indentation which circumscribes its inner circumference, said composite polar boss comprising:
    an annular billet which forms a ring with an outer circumference which is shaped to fit within the indentation of the solid fueled rocket motor case, said annular billet thereby being fixed to said solid fueled rocket motor case wherein said annular billet is constructed from carbonized spiral graphite cloth which has been impregnated with an epoxy resin to form an effective billet for temperatures up to about 350 degrees;
    a threaded metal interface ring which is fixed to and circumscribed by said annular billet, said threaded metal interface ring having a threaded inner circumference which screws onto a complementary set of threads on said closure to attach it to said solid fueled rocket motor case; and
    a means for fixing said threaded metal interface ring to said annular billet.

2. A composite polar boss, a defined in claim 1 wherein said threaded metal interface ring is constructed from aluminum and has an outer circumference which is shaped to fit against said annular billet's inner circumference, said threaded metal interface ring having an inner circumference such that said set of threads are machined thereon at a range extending between six threads per inch and eight threads per inch.

3. A composite polar boss, as defined in claim 2, wherein said fixing means comprises a film of adhesive epoxy which is layered between said annular billet and said threaded metal interface ring.

4. A composite polar boss for attaching a closure to a solid fueled rocket motor case, said solid fueled rocket motor case having an exhaust opening which has an indentation which circumscribes its inner circumference, said composite polar boss comprising:
    an annular billet which forms a ring with an outer circumference which is shaped to fit within the indentation of the solid fueled rocket motor case, said annular billet thereby being fixed to said solid fueled rocket motor case, said annual billet having a threaded inner circumference which screws onto a complementary set of threads on said closure to attach it to said solid fueled rocket motor case;
    a seal ring which is fixed to and circumscribed by said inner circumference of said annular billet on a location beneath said set of threads, said seal ring thereby sealing said closure as it is attached to said rocket motor case ring wherein said seal ring is constructed of aluminum; and
    a film of adhesive epoxy which is layered between said annular bllet and said threaded metal interface ring.

* * * * *